(12) United States Patent
Hu et al.

(10) Patent No.: US 9,547,823 B2
(45) Date of Patent: Jan. 17, 2017

(54) SYSTEMS AND METHODS OF USING A KNOWLEDGE GRAPH TO PROVIDE A MEDIA CONTENT RECOMMENDATION

(71) Applicant: Verizon Patent and Licensing Inc., Arlington, VA (US)

(72) Inventors: Si Ying Diana Hu, Sunnyvale, CA (US); Suri B. Medapati, San Jose, CA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 115 days.

(21) Appl. No.: 14/587,505

(22) Filed: Dec. 31, 2014

(65) Prior Publication Data

US 2016/0189028 A1 Jun. 30, 2016

(51) Int. Cl.
*G06F 1/00* (2006.01)
*G06N 5/00* (2006.01)
*G06N 5/02* (2006.01)
*G06F 3/0484* (2013.01)

(52) U.S. Cl.
CPC ............. *G06N 5/02* (2013.01); *G06F 3/04842* (2013.01)

(58) Field of Classification Search
CPC ............ G06N 5/04; G06N 5/02; G06N 5/022; G06Q 50/01
See application file for complete search history.

(56) References Cited

U.S. PATENT DOCUMENTS

| 2014/0067961 | A1* | 3/2014 | Archibong | .......... H04L 65/4084 709/205 |
| 2015/0052126 | A1* | 2/2015 | Bordino | ............ G06F 17/30867 707/725 |
| 2016/0071233 | A1* | 3/2016 | Macko | .................... G06F 17/10 345/440 |

\* cited by examiner

*Primary Examiner* — Stanley K Hill
*Assistant Examiner* — Kalpana Bharadwaj

(57) ABSTRACT

In an exemplary method, a media content recommendation system interfaces with a knowledge graph system to access knowledge graph data that represents a knowledge graph relationship between a subject and a media program in a knowledge graph, generates, based on the knowledge graph data, a media content recommendation that includes recommendation content indicating the media program and the knowledge graph relationship between the subject and the media program, and outputs the media content recommendation for presentation to a user by a user computing device.

20 Claims, 14 Drawing Sheets

SYSTEMS AND METHODS OF USING A KNOWLEDGE GRAPH TO PROVIDE A MEDIA CONTENT RECOMMENDATION

BACKGROUND INFORMATION

A media content recommendations engine identifies media content that may be of interest to a potential consumer of the media content, such a user of a media service. The media content recommendation engine may utilize any of a number of conventional media content recommendation technologies to identify, based on attributes of the media content and information about the user, media content that may be of interest to the user. For example, the media content recommendations engine may use collaborative filtering, matrix factorization, cosine similarity in a vector space model, or other conventional media content recommendation technologies to identify media content that may be of interest to the user.

Such conventional media content recommendation technologies have limitations and leave room for improvement. As an example, the quality of media content recommendations that are identified using certain conventional media content recommendation technologies is highly dependent on the quality of the data set to which the technologies are applied. However, curation of a quality data set, such as a quality vector space model data set that contains information useful for generating media content recommendations, is arduous for a media service provider. As another example, conventional media content recommendation technologies are limited in the information that can be used to identify media content recommendations, how the recommendations are identified from the information, the types of recommendations that can be identified from the information, and/or the information that can be provided to a user together with the media content recommendations.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Media content recommendation systems and methods are described herein. Specifically, exemplary systems and methods of using a knowledge graph to provide a media content recommendation are described herein. For example, a media content recommendation system may provide a media content recommendation by interfacing with a knowledge graph system to request and receive knowledge graph data and using the knowledge graph data to generate and output a media content recommendation.

Systems and methods described herein may leverage knowledge graph data to generate robust, informative, custom, diverse, and/or relation-based media content recommendations. The leveraging of knowledge graph data to generate media content recommendations may lead to generation of media content recommendations that could not otherwise be generated using only conventional media recommendation technologies. Examples of such media content recommendations, of accessing knowledge graph data, and of generating the media content recommendations based on the knowledge graph data are described herein. Additional or alternative benefits that may be provided by one or more of the exemplary systems and methods described herein will be made apparent herein. Exemplary systems and methods will now be described in reference to the drawings.

Figure 1:
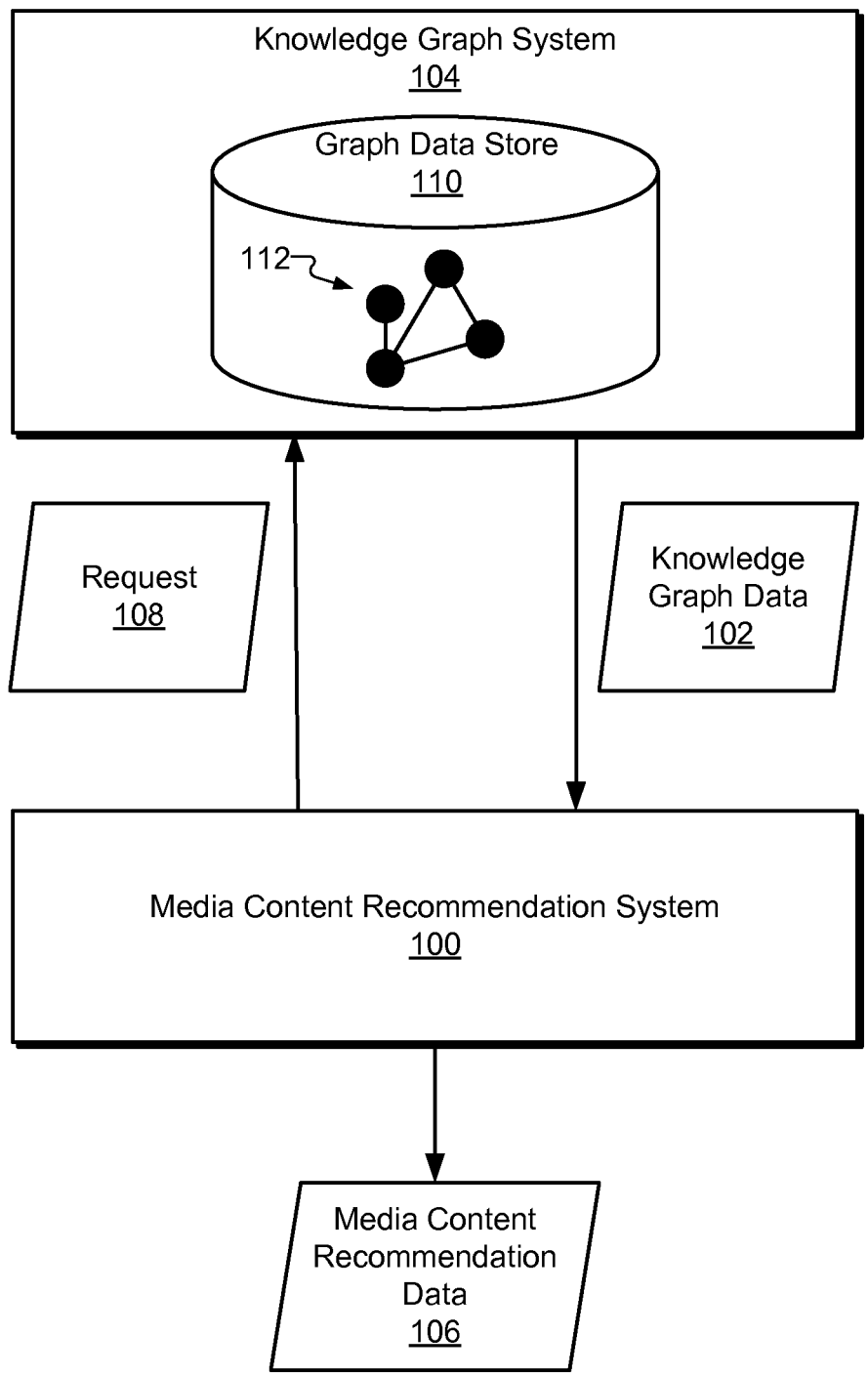
FIG. 1 illustrates an exemplary configuration in which a media content recommendation system requests and receives knowledge graph data from a knowledge graph system and uses the knowledge graph data to generate and output media content recommendation data representing a media content recommendation according to principles described herein.

FIG. 1 illustrates an exemplary system configuration in which a media content recommendation system 100 ("system 100") accesses knowledge graph data 102 from a knowledge graph system 104 and uses the knowledge graph data 102 to generate and output media content recommendation data 106 representing one or more media content recommendations. System 100 may be included in or implemented by one or more computing devices specifically configured to interface with knowledge graph system 104 to access knowledge graph data 102, such as by submitting a request 108 to knowledge graph system 104 and receiving knowledge graph data 102 from knowledge graph system 104 in response to request 108, and to process the accessed knowledge graph data 102 to generate and output media content recommendation data 106. In certain examples, system 100 may be associated with (e.g., operated by) a service provider, such as a media service provider (e.g., a media content distribution service provider, a media information service provider, a media content recommendation service provider, etc.). Exemplary components of and operations that may be performed by system 100 are described herein.

Knowledge graph system 104 may be included in or implemented by at least one computing device that maintains knowledge graph data stored in a knowledge graph data store 110 and provides other computing devices with access to the knowledge graph data in the knowledge graph data store 110. Knowledge graph system 104 may be associated with (e.g., operated and/or curated by) the same entity associated with system 100 or with an entity that is different from the entity associated with system 100. In certain examples, knowledge graph system 104 may be autonomous (e.g., separate and/or independent) of system 100.

System 100 and knowledge graph system 104 may communicate with one another using any suitable data communication technologies. Examples of such communication technologies include, but are not limited to, data transmission media, communications devices, Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Internet communication technologies, Application Program Interface ("API") technologies, and other suitable data communications technologies.

Knowledge graph system 104 may employ any data structure suitable for maintaining knowledge graph data in knowledge graph data store 110. In certain examples, knowledge graph data store 110 may include a knowledge graph database that employs graph structures such as nodes, properties, and edges based on graph theory to represent subjects and relationships between subjects. For example, knowledge graph data store 110 may include a knowledge graph database the employs nodes, properties, and edges defined in accordance with a graph data model such as a Resource Description Framework ("RDF") graph data model. Accordingly, knowledge graph data stored in knowledge graph data store 110 may include semantically linked data that is organized in accordance with a graph data model to form a multi-dimensional knowledge graph.

For example, knowledge graph system 104 may maintain a knowledge graph 112 in graph data store 110. Knowledge graph 112 may include nodes that represent subjects and edges that interconnect the nodes and represent relationships between and/or properties of the subjects. In certain examples, knowledge graph 112 may be defined by triples statements, such as a subject-predicate-object statement that indicates a predicate relationship between a subject and an object.

Knowledge graph system 104 may maintain knowledge graph data in knowledge graph data store 110 as proprietary or open source data. Knowledge graph system 104 may include any known knowledge graph system, such as knowledge graph systems known as DBPEDIA, FREEBASE, WIKIDATA, and KNOWLEDGE GRAPH. Knowledge graph system 104 may additionally or alternatively include or access one or more other sources of data, such as human and/or machine curated data, media caption data, media description data, and/or any other suitable source of data related to media content.

Knowledge graph data maintained by knowledge graph system 104 may include data that explicitly represents instances of media content as subjects and relationships of the instances of media content to one another and/or to other subjects in knowledge graph 112. As used herein, the term "media content" may refer to any form of media that may be distributed by a media distribution service and consumed by an end user of the service, such as commercially distributed forms of media. Media content may include discrete instances of media, which may be referred to as media programs. The term "media program" may refer to any television program, on-demand media program, pay-per-view media program, broadcast media program (e.g., broadcast television program), multicast media program (e.g., multicast television program), narrowcast media program (e.g., narrowcast video-on-demand program), IPTV media program, video, movie, audio program, radio program, and/or any other media content instance that may be distributed by way of a media distribution service and presented by way of a media content processing device (e.g., a set-top box device, a television device, a computing device, a mobile device, a media player device, etc.) for consumption by a user of the media content processing device.

As mentioned, system 100 may interface with knowledge graph system 104 to access knowledge graph data 102. System 100 may use any suitable computer interface technologies to interface with knowledge graph system 104 to request and receive knowledge graph data 102 in any of the ways described herein. In certain examples, system 100 may generate and send a request, such as request 108, to knowledge graph system 104. The request may include any data that may be processed by knowledge graph system 104 to perform one or more operations on knowledge graph 112 to identify and provide requested knowledge graph data 102 to system 100 in response to the request. For example, the request may be defined in accordance with one or more graph database query languages, such as SPARQL Protocol and RDF Query Language. The request may include any number and/or combinations of graph database queries and/or other instructions for operations on a graph database.

In certain examples, a request may include subject data for use by knowledge graph system 104 to identify nodes representing subjects and traversal data for use by knowledge graph system 104 to traverse knowledge graph 112 relative to the identified subject nodes. For purposes of generating media content recommendations, traversal of knowledge graph 112 may be more efficient than a series of table queries would be to query database tables. Traversal of knowledge graph 112 is helpful for identifying relationships between data in knowledge graph 112 and for generating highly interconnected media recommendations data.

Figure 2:
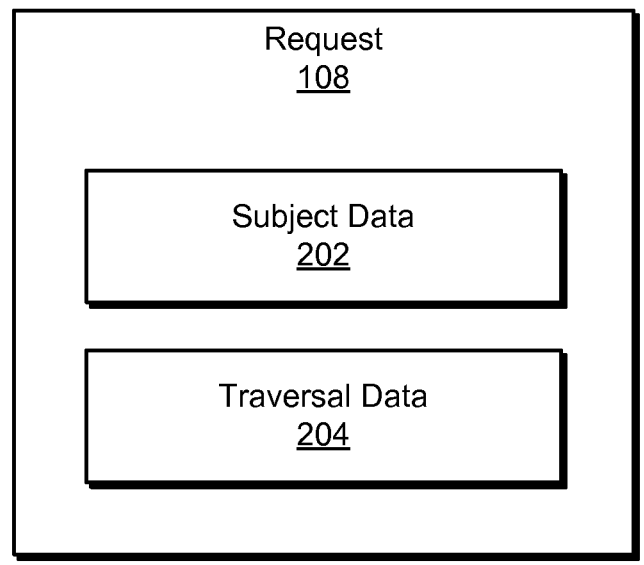
FIG. 2 illustrates a request that may be submitted by a media content recommendation system to a knowledge graph system according to principles described herein.

FIG. 2 illustrates an exemplary request 108 that includes subject data 202 and traversal data 204. Subject data 202 may indicate one or more subjects, which may include subjects represented by one or more nodes of knowledge graph 112. For example, subject data 202 may indicate one or more media programs and/or other name entities (typically nouns) as subjects.

In certain examples, subject data 202 may indicate a starting-point subject to be used as a starting point for one or more operations on knowledge graph 112. The starting-point subject may be represented by a node (a "starting node") in knowledge graph 112. Knowledge graph system 104 may use the subject data 202 to identify the starting-point subject and the starting node that represents the starting-point subject in knowledge graph 112.

In certain examples, subject data 202 may indicate an ending-point subject to be used as an ending point for one or more operations on knowledge graph 112. The ending-point subject may be represented by a node (an "ending node") in knowledge graph 112. Knowledge graph system 104 may use the subject data 202 to identify the ending-point subject and the ending node that represents the ending-point subject in knowledge graph 112.

Traversal data 204 may indicate how to traverse knowledge graph 112 to identify knowledge graph data to satisfy request 108. For example, traversal data 204 may indicate how to traverse knowledge graph 112 from a starting node that represents a starting-point subject to find an ending node that represents a media program (e.g., a media program that is related to the starting-point subject).

In certain examples, traversal data 204 may indicate one or more parameters and/or instructions for use by knowledge graph system 104 to find an ending node that represents a media program. Examples of parameters that may be included in traversal data 204 include, without limitation, one or more degree-of-separation parameters that specify a target degree-of-separation between a starting node and an ending node (e.g., a number of edges separating two nodes), a minimum threshold degree-of-separation between a starting node and an ending node, a maximum threshold degree-of-separation between a starting node and an ending node, one or more edge-selection parameters for use by knowledge graph system 104 to select, from multiple edges connected to a node, an edge to traverse from the node to another node, one or more relationship parameters (e.g., parameters specifying requirements for a particular target knowledge graph relationship being searched for in knowledge graph 112) for use by knowledge graph system 104 to determine whether an identified media program is related to the starting-point subject, any other suitable parameters, or any suitable combination or sub-combination thereof. Examples of instructions that may be included in traversal data 204 include, without limitation, an instruction to find one or more shortest paths between a starting node and an ending node, an instruction to continue to traverse away from a starting node at least until a minimum threshold degree-of-separation is reached, an instruction not to traverse away from a starting node beyond a maximum threshold degree-of-separation from the starting node, an instruction to traverse away from a starting node by using one or more edge-selection parameters to select, from multiple edges connected to a node, an edge to traverse, an instruction to traverse away from a starting node to find an ending node that represents a media program that satisfies one or more relationship parameters indicating a target relationship between the media program and the starting-point subject represented by the starting node, any other suitable instruction, or any suitable combination or sub-combination thereof. Examples of traversals of knowledge graph 112 based on such parameters and/or instructions are described herein.

In certain examples, traversal data 204 may include user data for a user (e.g., a user of a computing device and/or a media service). The user data may indicate any information about the user, such as information indicating one or more preferences of the user (e.g., attributes of media programs and/or relationships with media programs that are preferred by the user), a history of the user with a media service (e.g., a history indicating media programs that have been previously accessed and/or consumed by the user, attributes of media programs that are favored by the user in interactions with the media service, etc.), a subscription package of the user with a media service (e.g., a subscription package indicating media channels and/or media programs to which the user has access by way of a subscription with the media service), demographic information for the user, any other useful information about the user, and any combination or sub-combination thereof. Such user data may be represented as one or more parameters and/or instructions in traversal data 204.

In certain examples, traversal data 204 may include media service data for a media service. The media service data may indicate any information about the media service, such as information indicating types of and/or specific media channels and/or media programs that are offered and/or accessible through the media service. Such media service data may be represented as one or more traversal parameters and/or instructions in traversal data 204.

In certain alternative examples, user data and/or media service data may not be included in traversal data 204. In such examples, system 100 may access and use user data and/or media service data to generate a media content recommendation based on knowledge graph data 102 accessed from knowledge graph system 104. Examples of system 100 using user data and/or media service data to generate a media content recommendation based on knowledge graph data 102 are described herein.

Traversal data 204 may be used by knowledge graph system 104 to traverse knowledge graph 112 to find specific knowledge graph data 102 to return to system 100 in response to request 108. For example, knowledge graph system 104 may use traversal data 204 to traverse knowledge graph 112 to find an ending node that represents a media program that is related to a starting-point subject. As part of finding the ending node, knowledge graph system 104 may determine that the media program satisfies one or more parameters indicated by traversal data 204. For instance, knowledge graph system 104 may determine that the media program has a target degree-of-separation from the starting-point subject, that the media program has not been previously accessed or consumed by the user through the media service, that the media program is accessible by the user through the media service, that the media program has attributes that satisfy preferences of the user and/or specified relationship parameters, and/or that the media program otherwise satisfies one or more parameters indicated by the traversal data 204.

Exemplary traversals of knowledge graph 104 by knowledge graph system 104 in accordance with specific examples of subject data 202 and traversal data 204 that may be included in request 108 to identify knowledge graph data 102 to provide to system 100 will now be described. The described examples are illustrative only. Other traversals may be performed by knowledge graph system 104 in accordance with other instances of subject data 202 and traversal data 204 in other examples.

In one example, request 108 may include subject data 202 that indicates two specific media programs, such as media program A and media program B. The subject data 202 may indicate one of the media programs, for example media program A, to be a starting-point subject.

Request 108 may further include traversal data 204 indicating how to traverse knowledge graph 112 from a starting node that represents media program A to find an ending node that represents media program B. For example, traversal data 204 may include an instruction to find, within knowledge graph 112, a shortest path from media program A to media program B.

Traversal data 204 may further indicate one or more other parameters that are to be satisfied by a path between media program A and media program B in order for the path to be considered as a shortest path option. For example, traversal data 204 may include one or more parameters that limit shortest-path options to include only paths that represent certain types of relationships (e.g., genre relationships) between nodes and/or to exclude paths that represent or do not represent certain types of relationships.

Based on the data included in request 108, knowledge graph system 104 may traverse knowledge graph 112 from a starting node that represents media program A to an ending node that represents media program B to find the shortest path between media programs A and B in knowledge graph 112. Once knowledge graph system 104 identifies the shortest path between media programs A and B that satisfies any parameters included in request 108, knowledge graph system 104 may identify specific knowledge graph data 102 to provide to system 100 in response to request 108. For example, knowledge graph system 104 may identify and provide knowledge graph data 102 that indicates the shortest path between media program A and media program B and/or one or more attributes of the shortest path. For instance, the knowledge graph data 102 may indicate nodes and edges spanned by the shortest path, a degree-of-separation between media program A and media program B as represented by the shortest path, one or more types of relationships represented along the path (e.g., types of relationships represented by edges along the path), and/or any other information represented by the shortest path. To illustrate, the knowledge graph data 102 may indicate that the shortest path represents a first degree-of-separation actor-type relationship between media program A and media program B to represent a knowledge graph configuration in which the node that represents media program A is connected by a single actor-type edge to a node that represents an actor cast in media program A, and the node that represents media program B is also connected by a single actor-type edge to the node that represents the actor.

Figure 3:
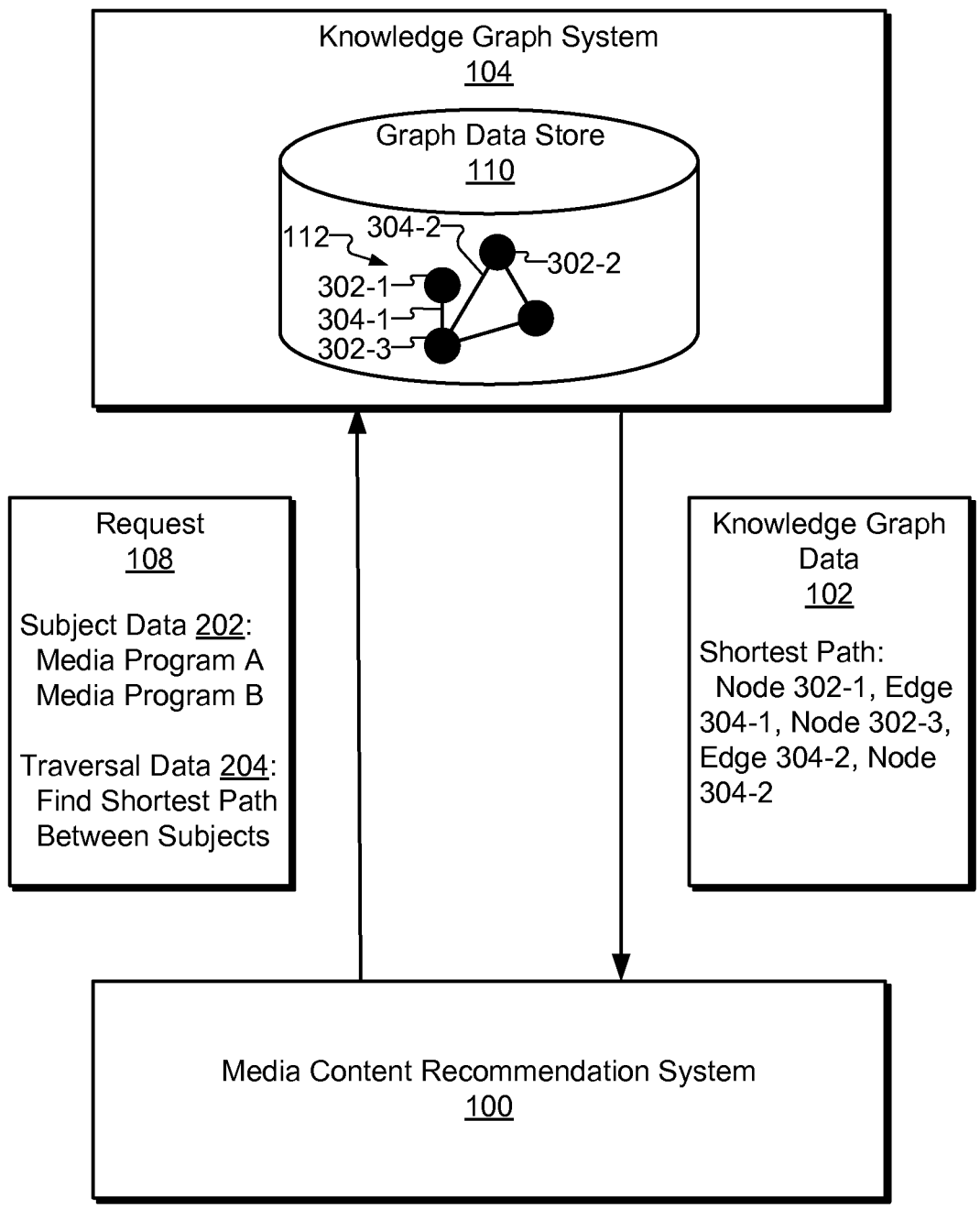
FIGS. 3-5 illustrate examples of a media content recommendation system sending exemplary requests to a knowledge graph system and receiving exemplary knowledge graph data from the knowledge graph system in response to the requests according to principles described herein.

FIG. 3 illustrates the above-described example in which request 108 is submitted by system 100 to knowledge graph system 104 and includes subject data 202 indicating media program A as a starting-point subject and media program B as an ending-point subject and traversal data 204 indicating an instruction to find the shortest path between media program A and media program B. Knowledge graph system 104 may receive and process request 108 to find the shortest path in accordance with request 108. This may include knowledge graph system 104 traversing knowledge graph 112 to determine that the shortest path between a node 302-1 that represents media program A and a node 302-2 that represents media program B is the path that spans from node 302-1 to a node 302-3 along an edge 304-1 and from node 302-3 to node 302-2 along an edge 304-2.

Knowledge graph system 104 may provide knowledge graph data 102 that indicates the shortest path to system 100 in response to request 108. For example, knowledge graph data 102 may indicate the nodes and edges in the order they are spanned by the shortest path from the starting node to the ending node. The knowledge graph data 102 may include any information about the nodes and edges, such as the subjects of the nodes and/or the relationships represented by the edges between the nodes.

While the above-describe example is directed to a request for the shortest path between media program A and media program B, in other examples, a request may be for a set of paths between media program A and media program B. As an example, the request may be for the five shortest paths (or any other suitable number of shortest paths) between media program A and media program B. As another example, the request may be for the shortest path between media program A and media program B for each of a number of specific types of relationships (e.g., the shortest actor-type relationship path and the shortest genre-type relationship path between media program A and media program B). In such examples, knowledge graph data 102 received by system 100 in response to the request may indicate a set of paths between media program A and media program B.

In another example, request 108 may include subject data 202 that indicates a specific media program, such as media program A, to be a starting-point subject. Request 108 may further include traversal data 204 that includes an instruction to traverse knowledge graph 112 from a starting node that represents media program A to find an ending node that represents an unspecified media program that is related to media program A.

Traversal data 204 may indicate one or more parameters that are to be satisfied in order for a discovered media program to be considered to be related to media program A. Knowledge graph system 104 may use these parameters to determine whether the discovered media program will be considered the end result of the traversal of knowledge graph 112 in response to request 108, or whether to continue to traverse knowledge graph 104 to find a media program that satisfies the parameters.

To illustrate, traversal data 204 may include a relationship parameter indicating a type of relationship, a parameter specifying a maximum threshold degree-of-separation for the type of relationship, and an instruction to find a media program that is related to media program A in a way that satisfies the parameters. Accordingly, knowledge graph system 104 may traverse knowledge graph 112 starting from the starting node that represents media program A in search of a media program that has the specified type of relationship with media program A within the maximum threshold degree-of-separation.

Once knowledge graph system 104 determines that a media program related to media program A has been found, knowledge graph system 104 may identify specific knowledge graph data 102 to provide to system 100 in response to the request. For example, knowledge graph system 104 may provide knowledge graph data 102 that indicates the identified media program and a knowledge graph path that has been traversed to find the ending node that represents the media program that is related to media program A. The knowledge graph data 102 may further indicate one or more attributes of the traversed path. For instance, the knowledge graph data 102 may indicate nodes and edges spanned by the traversed path, a degree-of-separation between media program A and the related media program as represented by the traversed path, one or more types of relationships represented along the traversed path, and/or any other information represented by the traversed path.

Figure 4:
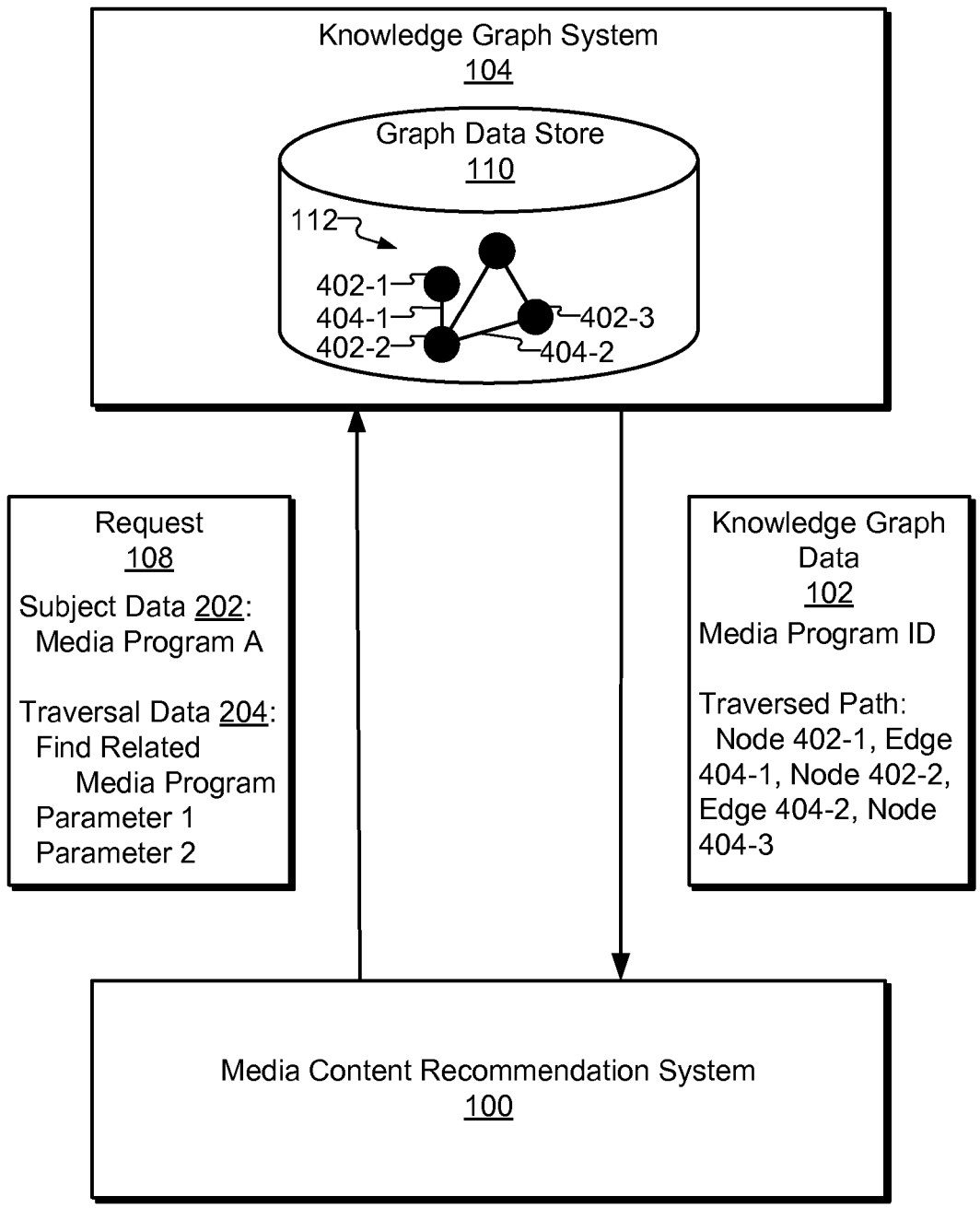

FIG. 4 illustrates the above-described example in which request 108 is submitted by system 100 to knowledge graph system 104 and includes subject data 202 indicating media program A as a starting-point subject and traversal data 204 indicating an instruction to traverse knowledge graph 112 to find a media program that is related to media program A in accordance with parameters (e.g., "parameter 1" and "parameter 2") indicated in request 108. Knowledge graph system 104 may receive and process request 108 to traverse knowledge graph 112 to find a media program that is related to media program A in a manner that satisfies the parameters included in request 108. For example, knowledge graph system 104 may start at a node 402-1 that represents media program A, traverse an edge 404-1 to reach a node 402-2, traverse an edge 404-2 to reach a node 402-3, and determine that node 402-3 represents a media program that is related to media program A in a way that satisfies the parameters included in request 108.

Knowledge graph system 104 may then provide knowledge graph data 102 that indicates the related media program (e.g., a media program identifier) and the traversed path to system 100 in response to request 108. For example, knowledge graph data 102 may indicate the nodes and edges in the order they are spanned by the traversed path from the starting node to the ending node. The knowledge graph data 102 may include any information about the nodes and edges, such as the subjects of the nodes and/or the relationships represented by the edges between the nodes.

While the above-described example is directed to a request for a media program that is related to a starting-point subject in the form of media program A, in other examples, the starting-point subject may be a different media program or a name entity other than a media program (i.e., a non-media-program subject). For example, the request may include an instruction to find an unspecified media program that is related to the subject of "aliens."

While the above-described examples are directed to a request for a media program that is related to a single starting-point subject in the form of a media program or a non-media-program subject, in other examples, a request may include subject data 202 indicating multiple starting-point subjects. The multiple starting-point subjects may be multiple media programs, multiple non-media-program subjects, or a combination of at least one media program and at least one non-media-program subject. As an example, a request may include an instruction to find an unspecified media program that is related to media program A and the subject of "aliens." As another example, a request may include an instruction to find an unspecified media program that is related to the subjects of "aliens" and "unidentified flying objects." For such requests, knowledge graph system 104 may traverse knowledge graph 112 to find a media program that is related to the multiple starting-point subjects indicated by the request.

In another example, request 108 may include subject data 202 that indicates a specific media program, such as media program A, to be a starting-point subject. Request 108 may further include traversal data 204 that indicates how to traverse the knowledge graph 112 from a starting node that represents media program A to find an ending node that represents another unspecified media program. For example, traversal data 204 may indicate one or more edge-selection parameters for use by knowledge graph system 104 to select, from multiple edges connected to a node, which edge to traverse. To illustrate, knowledge graph system 104 may begin a traversal of knowledge graph 112 at a starting node that represents media program A. Multiple edges may be connected to the starting node. Based on the edge-selection parameters, knowledge graph system 104 may select which of the edges to traverse. Knowledge graph system 104 may then traverse the selected edge to arrive at another node in knowledge graph 112. Knowledge graph system 104 may again use the edge-selection parameters to select, from multiple edges connected to the other node, which of the edges to traverse away from the other node. Knowledge graph system 104 may continue traversing knowledge graph 112 in this manner until reaching an ending node that represents a media program and satisfies the parameters included in request 108. For example, request 108 may indicate a minimum degree-of-separation. Once the traversal of knowledge graph 112 has reached a node having at least a minimum degree-of-separation from the starting node, knowledge graph system 104 may look for and find a node that represents a media program, which node would satisfy the parameters of request 108.

The edge-selection parameters may specify any information that may be used by knowledge graph system 104 to select an edge from a plurality of edges. For example, the edge-selection parameters may specify a prioritization of relationships represented by the edges. To illustrate, the edge-selection parameters may indicate that a genre-type relationship is to be prioritized over an actor-type relationship. Accordingly, knowledge graph system 104 would select an edge that represents a genre-type relationship over an edge that represents an actor-type relationship.

Once knowledge graph system 104 determines that an ending node that represents a media program has been found, knowledge graph system 104 may identify specific knowledge graph data 102 to provide to system 100 in response to the request. For example, knowledge graph system 104 may provide knowledge graph data 102 that indicates the identified media program and a knowledge graph path that has been traversed to find the ending node that represents the media program. The knowledge graph data 102 may further indicate one or more attributes of the traversed path. For instance, the knowledge graph data 102 may indicate nodes and edges spanned by the traversed path, a degree-of-separation between media program A and the identified media program as represented by the traversed path, one or more types of relationships represented along the traversed path, and/or any other information represented by the traversed path.

Figure 5:
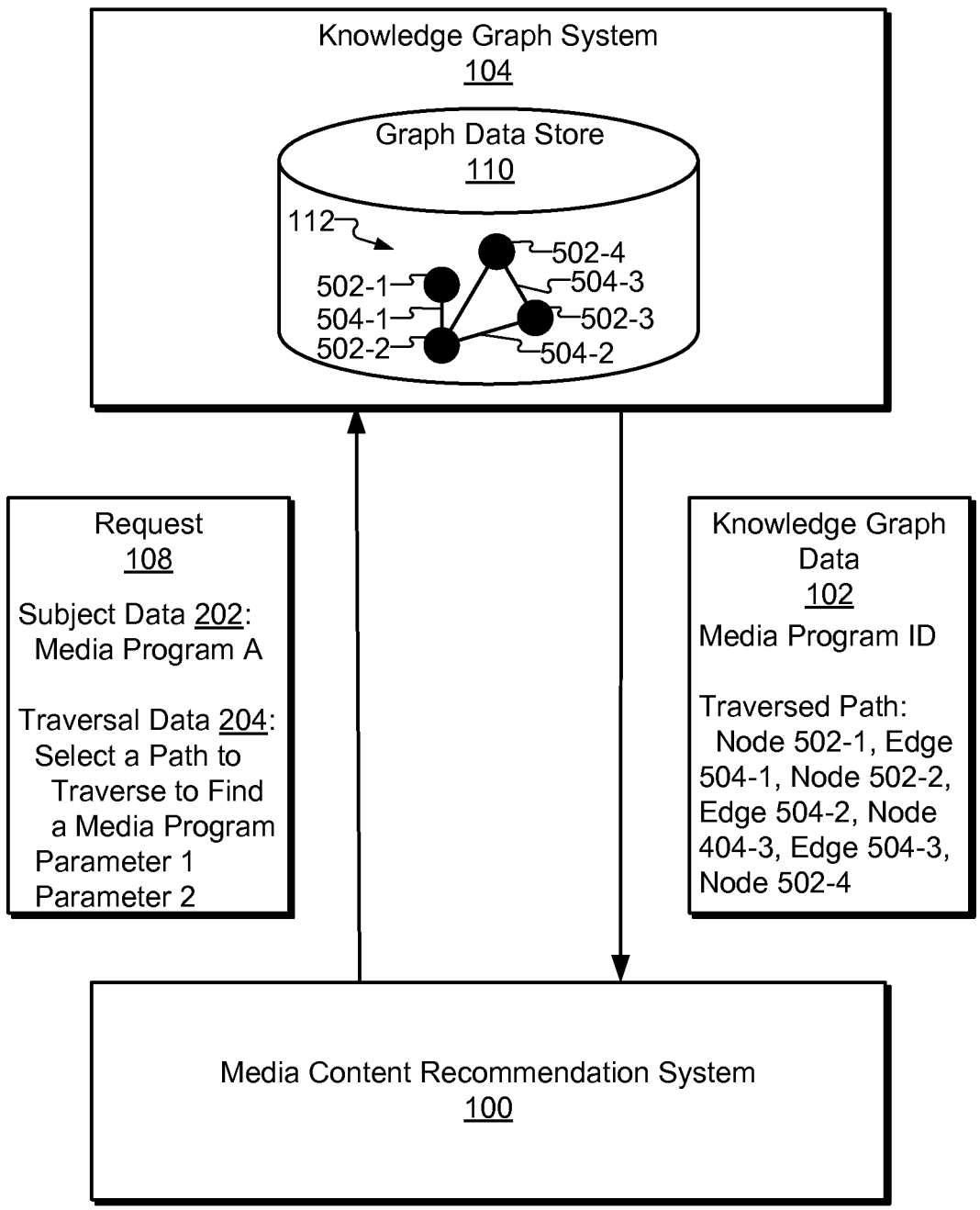

FIG. 5 illustrates the above-described example in which request 108 is submitted by system 100 to knowledge graph system 104 and includes subject data 202 indicating media program A as a starting-point subject and traversal data 204 indicating an instruction to traverse knowledge graph 112 by choosing a path to traverse in accordance with parameters (e.g., "parameter 1" and "parameter 2") indicated in request 108 to find an unspecified media program. Knowledge graph system 104 may receive and process request 108 to traverse knowledge graph 112 along a path that is selected based on the parameters to find an ending node that satisfies the parameters and represents a media program. For example, knowledge graph system 104 may start at a node 502-1 that represents media program A, traverse an edge 504-1 to reach a node 502-2, traverse an edge 504-2 to reach a node 502-3, traverse an edge 504-3 to reach a node 502-4, and determine that node 502-4 satisfies the parameters and represents a media program. In this example, the path may be selected by knowledge graph system 104 choosing edges to traverse based on one or more edge-selection parameters.

Knowledge graph system 104 may then provide knowledge graph data 102 that indicates the identified media program and the traversed path to system 100 in response to request 108. For example, knowledge graph data 102 may indicate the nodes and edges in the order they are spanned by the traversed path from the starting node to the ending node. The knowledge graph data 102 may include any information about the nodes and edges, such as the subjects of the nodes and/or the relationships represented by the edges between the nodes.

While the above-described example is directed to a request to choose a path to traverse, starting from a starting node that represents a starting-point subject in the form of media program A and to find an unspecified media program, in other examples, the starting-point subject may be a different media program or a name entity other than a media program (i.e., a non-media-program subject). For example, the request may include an instruction to start from a starting node that represents the subject of "aliens" and choose a path to traverse to find an unspecified media program.

While one or more of the above-described examples are directed to a request to traverse knowledge graph 112 to find a media program, in other examples, a request may include an instruction to traverse knowledge graph 112 by way of one or more paths to find multiple media programs.

System 100 may receive knowledge graph data 102 provided by knowledge graph system 104 in response to request 108 and use the knowledge graph data 102 to provide a media content recommendation. For example, system 100 may process the knowledge graph data 102 and generate, based on the knowledge graph data 102, media content recommendation data 106 that represents a media content recommendation.

Knowledge graph data 102 received by system 100 may indicate one or more paths traversed through knowledge graph 112. System 100 may use this information about traversed paths to provide a robust media content recommendation, such as by providing an explanation of and/or a context to the media content recommendation. For example, the media content recommendation may specify a context of a media content recommendation by providing an explanation of an explicit relationship and/or a reason why the media content recommendation is being provided. For instance, media content recommendation data may indicate that a particular media program "A" is recommended because a user has watched a different media program "B" that is connected to media program "A" by having a particular genre "G" and a particular actor "A."

A media content recommendation generated by system 100 may include recommendation content that indicates one or more recommended media programs. In certain examples, the recommendation content may indicate information about recommended media programs, such as information about knowledge graph relationships for recommended media programs. The recommendation content may be in any suitable form, such as computer-readable and/or user-readable data representing recommended media content and associated information. Examples of recommendation content will now be described.

In certain examples, system 100 may generate a content-to-content media content recommendation that includes recommendation content that indicates two media programs and at least one knowledge graph relationship between the media programs. For example, system 100 may generate a media content recommendation that includes recommendation content that indicates media program A, media program B, and at least one knowledge graph relationship between media program A and media program B. The recommendation content may indicate information about the knowledge graph relationship, such as a type and/or a strength of the knowledge graph relationship.

Figure 6:
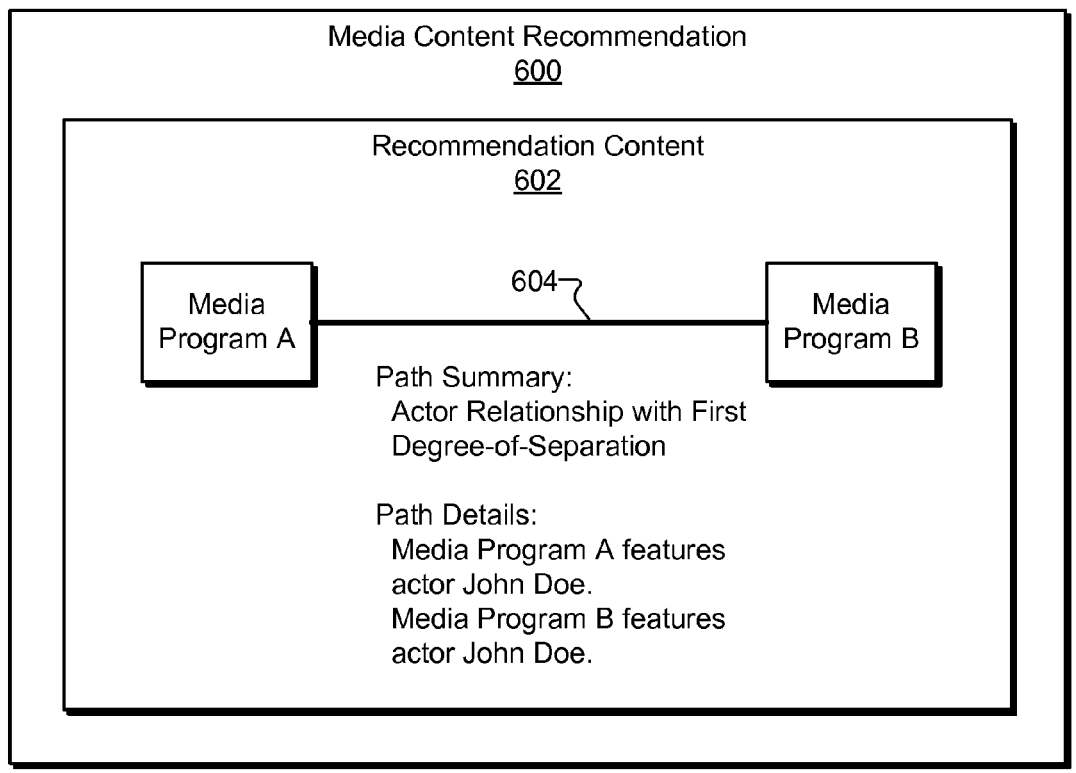
FIGS. 6-7 illustrate examples of media content recommendations according to principles described herein.

FIG. 6 illustrates an example of a media content recommendation 600 that includes recommendation content 602 that indicates media program A, media program B, and a knowledge graph relationship 604 between media program A and media program B. Recommendation content 602 may indicate information about the knowledge graph relationship 604. As shown, for example, recommendation content 602 may indicate that the knowledge graph relationship 604 includes a knowledge graph path between media program A and media program B and that the knowledge graph relationship 604 is an actor-type relationship with a first degree-of-separation. Recommendation content 602 may further indicate details about the knowledge graph relationship 604, such as details about the relationships of media program A and media program B to a common actor (e.g., the fact that media program A and media program B both feature the same actor).

Knowledge graph relationship 604 may represent any knowledge graph path between media programs A and B. For example, knowledge graph relationship 604 may represent any knowledge graph path that has been traversed by knowledge graph system 104 based on request 108 as described above.

Figure 7:
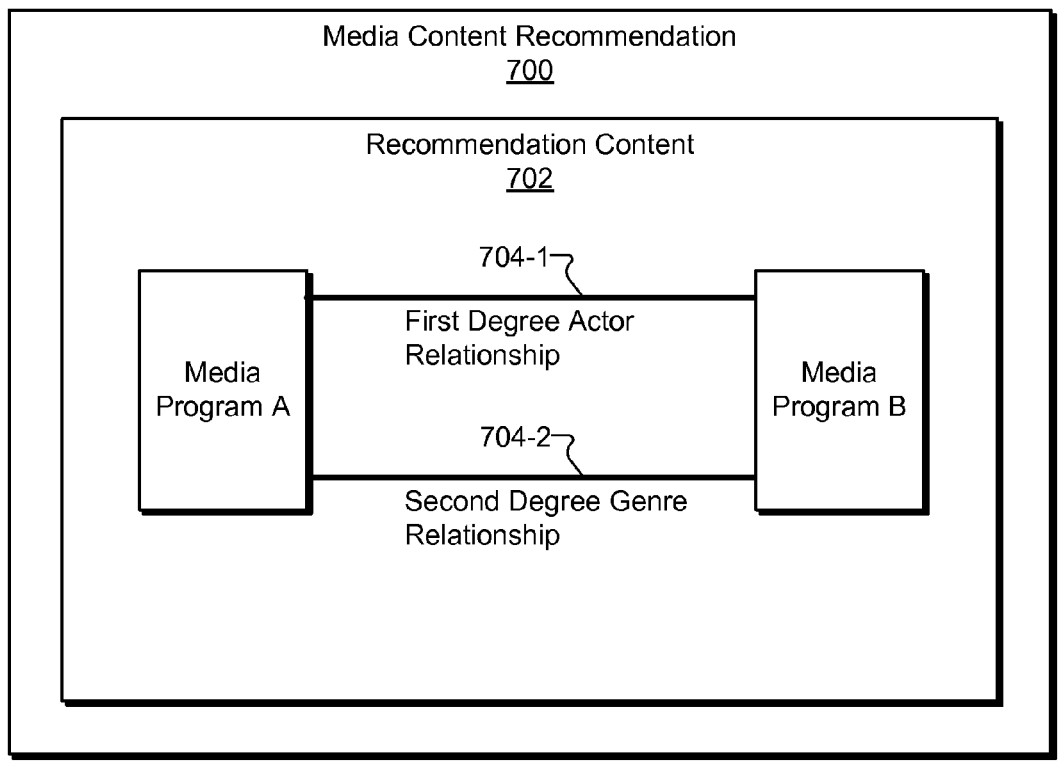

FIG. 7 illustrates an example of a content-to-content media content recommendation 700 that includes recommendation content 702 that indicates media program A, media program B, and multiple knowledge graph relationships 704 (e.g., knowledge graph relationships 704-1 and 704-2) between media program A and media program B. Recommendation content 702 may indicate information about the knowledge graph relationships 704. As shown, for example, recommendation content 702 may indicate that the knowledge graph relationships 704 include different knowledge graph paths between media program A and media program B and that the knowledge graph relationships 704 include an actor-type knowledge graph relationship 704-1 with a first degree-of-separation and a genre-type knowledge graph relationship 704-2 with a second degree-of-separation. Although not shown in FIG. 7, recommendation content 702 may indicate further details about the knowledge graph relationships 704.

Knowledge graph relationships 704 may represent any knowledge graph paths between media programs A and B. For example, knowledge graph relationships 704 may represent any knowledge graph paths that have been traversed by knowledge graph system 104 based on request 108 as described above.

In addition or alternative to recommendation content indicating two media programs and at least one knowledge graph relationship between the media programs, recommendation content may indicate at least one knowledge graph relationship between a non-media-program subject and a media program subject. Such recommendation content may indicate information about the knowledge graph relationship, such as described herein.

System 100 may process knowledge graph data 102 in any suitable way to generate a media content recommendation. For example, system 100 may interpret, translate, compare, filter, prioritize, and/or otherwise process any data included in knowledge graph data 102 to generate a media content recommendation.

In certain examples, system 100 may maintain and/or access data representative of a media content recommendation generation heuristic that specifies a set of rules to be followed by system 100 in generating a media content recommendation based on knowledge graph data 102. The heuristic may specify any suitable set of rules as may suit a particular implementation.

Figure 8:
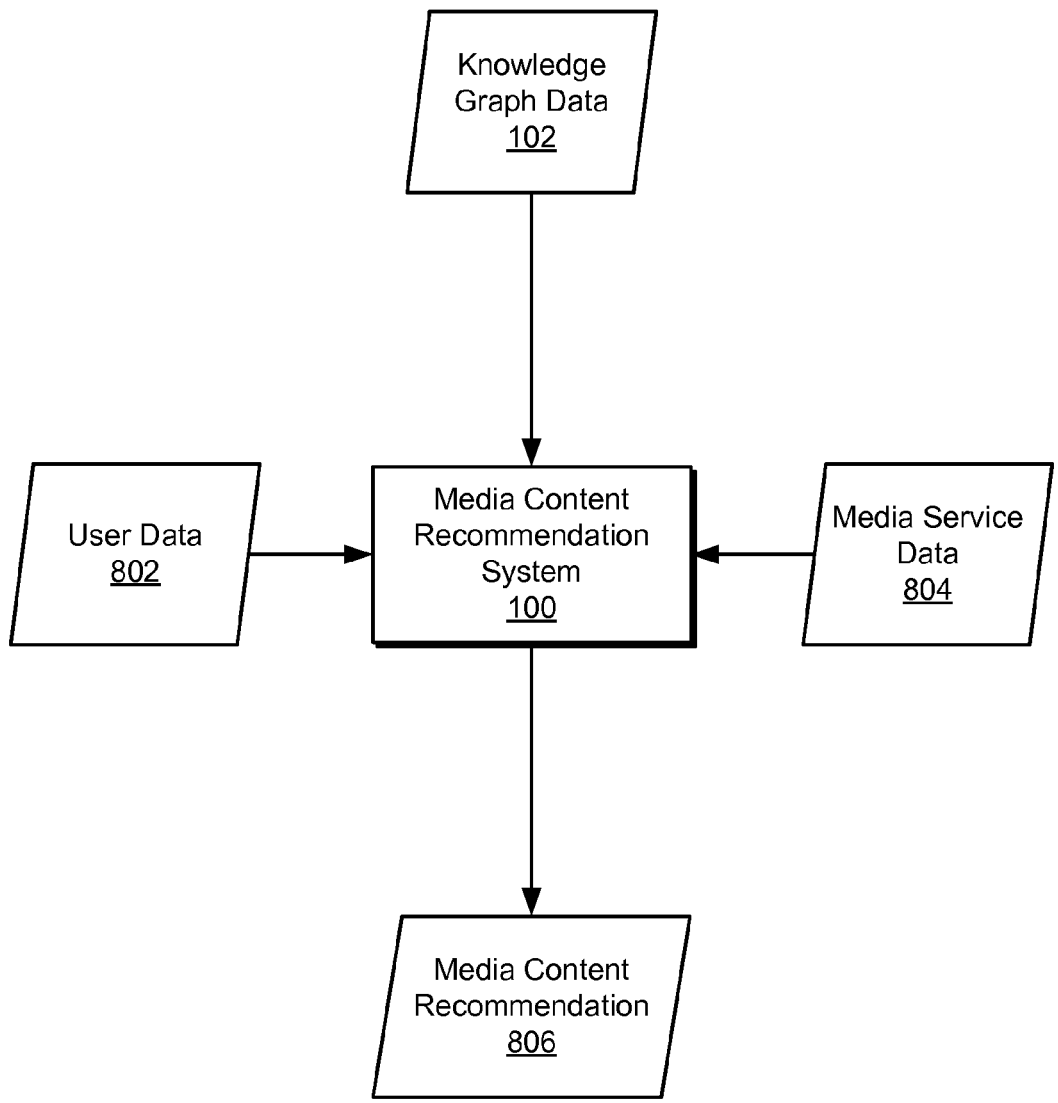
FIG. 8 illustrates an example of a media content recommendation system using various types of data to generate a media content recommendation according to principles described herein.

In certain examples, system 100 may maintain, access, and/or use user data and/or media service data to generate a media content recommendation based on knowledge graph data 102. For example, system 100 may apply any information included in user data and/or media service data to knowledge graph data 102 to filter, prioritize, and/or otherwise process data included in knowledge graph data 102. FIG. 8 illustrates an example of system 100 receiving a combination of user data 802, media service data 804, and knowledge graph data 102 as input for use by system 100 to generate a media content recommendation 806.

System 100 may apply user data 802 to knowledge graph data 102 in any suitable way to affect the generation of media content recommendation 806. To illustrate one example, user data 802 may indicate a set of media programs that have been previously consumed by a user. Knowledge graph data 102 may indicate a particular media program. System 100 may check whether the particular media program is included in the set of media programs previously consumed by the user. If it is, system 100 may refrain from using that particular media program when generating a media content recommendation. To illustrate another example, user data 802 may indicate a preference of a user for a particular genre of media content. Knowledge graph data 102 may indicate a set of media programs. System 100 may apply the user data 802 by prioritizing a media program included in the set over other media programs in the set, based on the genre preference of the user, when generating media content recommendation 806.

System 100 may apply media service data 804 to knowledge graph data 102 in any suitable way to affect the generation of media content recommendation 806. To illustrate one example, media service data 804 may indicate a set of media channels that are accessible to a user. Knowledge graph data 102 may indicate a set of media programs. System 100 may apply the media service data 804 by prioritizing a media program included in the set that is available to the user by way of one of the accessible media channels when generating media content recommendation 806.

In certain examples, as part of generating a media content recommendation, system 100 may generate a similarity score based on knowledge graph data 102. For example, system 100 may generate a similarity score based on one or more knowledge graph relationships between two media programs. System 100 may generate the similarity score based on a set of rules specified by a similarity score generation heuristic. The heuristic may specify any suitable set of rules as may serve a particular implementation, with the rules specifying any criteria to be accounted for when generating a similarity score. Examples of such criteria include, without limitation, a number of knowledge graph relationships between media programs, types of knowledge graph relationships between media programs, and strength of relationships between media programs (e.g., degrees-of-separation of knowledge graph relationships between media programs). A similarity score may be indicated by recommendation content. In certain examples, weights applied to a relationship between media programs and/or to a media content recommendation may be dependent on a strength and/or a relevance of a given relationship between two knowledge graph nodes relative to a comparison to one or more other possible relationships in knowledge graph 112. One way to measure this is through information gain and/or entropy of a value of an edge in knowledge graph 112.

In certain examples, as part of generating a media content recommendation, system 100 may assign and/or apply weights to knowledge graph relationships. For example, relationships with relatively smaller degrees of separation may be given more weight than relationships with relatively larger degrees of separation. As another example, certain types of relationships may be give more weight than other types of relationships. In this or a similar manner, links between related subjects may be weighted and used by system 100 to generate a media content recommendation.

Figure 9:
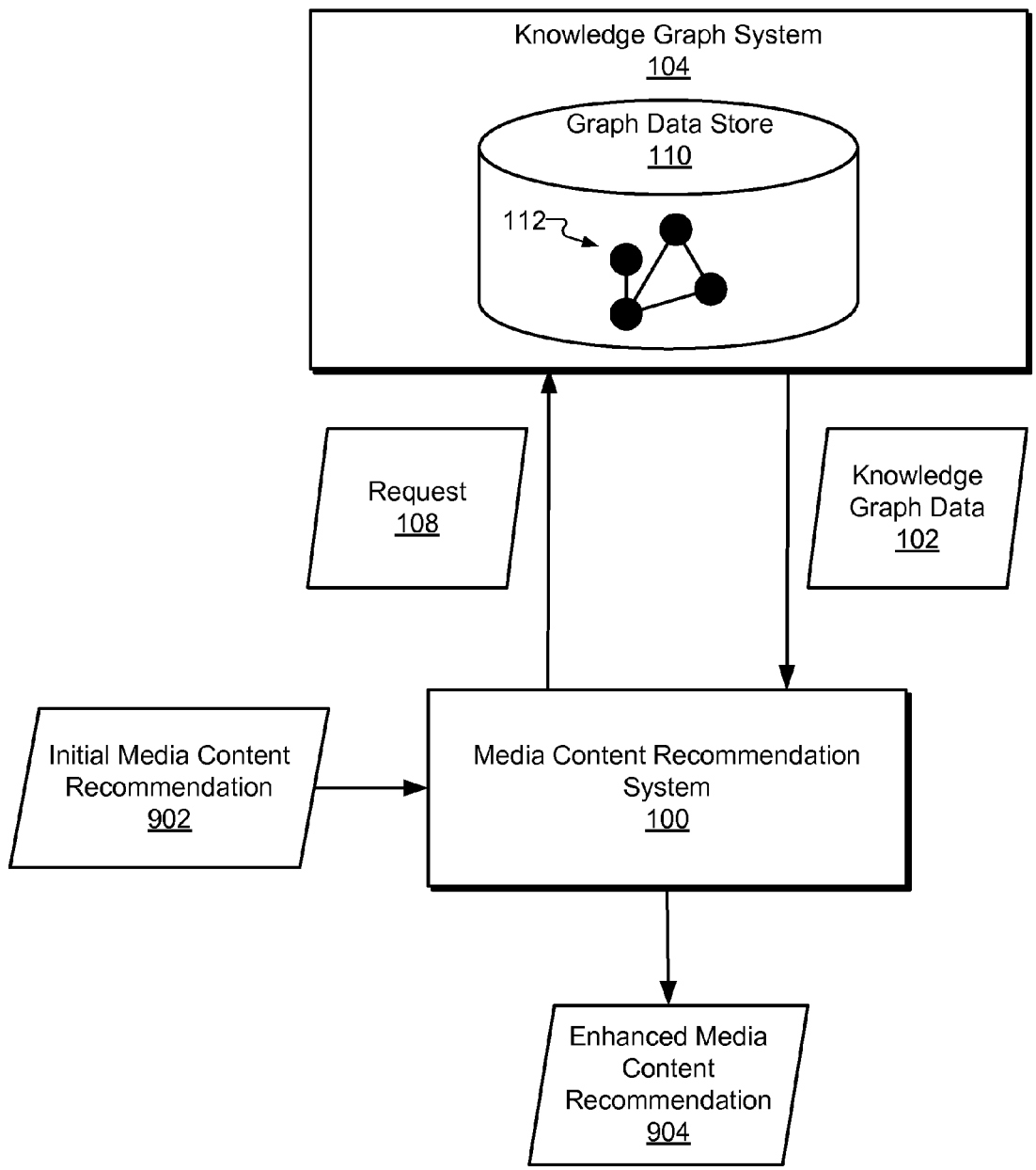
FIG. 9 illustrates an example of a media content recommendation system generating an enhanced media content recommendation from an initial media content recommendation according to principles described herein.

In certain examples, system 100 may perform one or more of the operations described herein to generate an enhanced media content recommendation from an initial media content recommendation. To illustrate, FIG. 9 shows system 100 receiving an initial media content recommendation 902. System 100 may receive the initial media content recommendation 902 from any suitable source. The initial media content recommendation 902 may be generated by a media content recommendation engine using any media content recommendation technologies and may indicate a set of one or more recommended media programs.

System 100 may generate request 108 based on the initial media content recommendation 902. For example, system 100 may generate request 108 to include subject data 202 that indicates a media program indicated in the initial media content recommendation 902. To illustrate, the initial media content recommendation 902 may recommend media program B and media program C to a user based on relationships of those media programs to media program A that has been consumed by the user. System 100 may generate request 108 to include subject data 202 that indicates media programs A and B and traversal data 204 that includes an instruction to find a path between media programs A and B. System 100 may also include, in request 108, subject data 202 that indicates media programs A and C and traversal data 204 that includes an instruction to find a path between media programs A and C.

In response to a submission of request 108 to knowledge graph system 104, system 100 may receive knowledge graph data 102 that indicates a knowledge graph relationship between media programs A and B and a knowledge graph relationship between media programs A and C. System 100 may use the knowledge graph data 102 to generate an enhanced media content recommendation 904, which, compared to the initial media content recommendation 902 may be enhanced based on knowledge graph data 102. For example, system 100 may apply the knowledge graph data 102 to the initial media content recommendation 902 to generate enhanced media content recommendation 904. To illustrate, media programs recommended in the initial media content recommendation 902 may be filtered and/or prioritized by system 100 based on knowledge graph data 102 to generate enhanced media content recommendation 904. Additionally or alternatively, system 100 may add information about a knowledge graph relationship to enhanced media content recommendation 904, such that enhanced media content recommendation 904 includes more and/or different information about a recommended media program than is included in the initial media content recommendation 902. For instance, enhanced media content recommendation 904 may include any of the exemplary recommendation content described herein. The enhanced media content recommendation 904 and/or information included in the enhanced media content recommendation 904 may be more helpful and/or interesting to the user than the initial media content recommendation 902. For example, the user may be able to ascertain how media programs B and C are each related to media program A in knowledge graph 112.

System 100 may output a generated media content recommendation for presentation to a user. For example, system 100 may output data representative of the media content recommendation to a user computing device for presentation by the user computing device to the user. The outputted data may be in any format suitable for processing by the user computing device to present the media content recommendation to the user. The presentation may be in any manner suitable for the user to experience the media content recommendation. For example, the media content recommendation may be presented in a user interface, such as graphical content in a graphical user interface.

Figure 10:
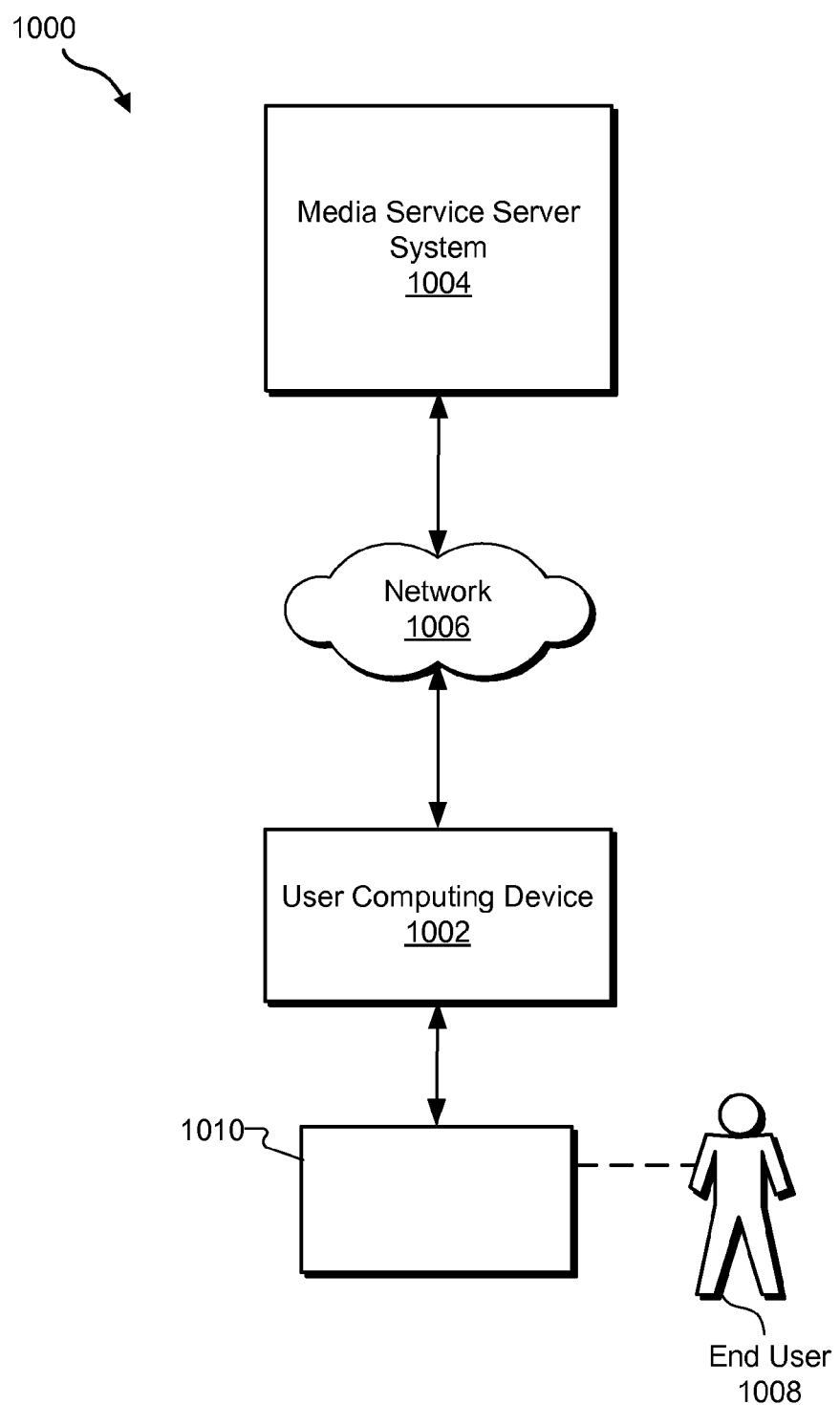
FIG. 10 illustrates an exemplary implementation of a media content recommendation system according to principles described herein.

FIG. 10 illustrates an exemplary implementation 1000 of system 100. As shown in FIG. 10, implementation 1000 may include a user computing device 1002 communicatively coupled to a media service server system 1004 ("server system 1004") by way of a network 1006. In implementation 1000, system 100 or any of the components or operations of system 100 may be implemented entirely by user computing device 1002, entirely by server system 1004, or distributed across user computing device 1002 and server system 1004.

Server system 1004 and user computing device 1002 may communicate using any communication platforms and technologies suitable for transporting data and/or communication signals, including any of the communication technologies mentioned herein. Network 1006 may include, but is not limited to, one or more wireless networks (Wi-Fi networks), wireless communication networks, mobile telephone networks (e.g., cellular telephone networks), mobile phone data networks, broadband networks, narrowband networks, the Internet, local area networks, wide area networks, live television transmission networks, and any other networks capable of carrying media content, data, and/or communications signals between user computing device 1002 and server system 1004. Communications between user computing device 1002 and server system 1004 may be transported using any one of the above-listed networks, or any combination or sub-combination of the above-listed networks. Alternatively, user computing device 1002 and server system 1004 may communicate in another way such as by one or more direct connections between user computing device 1002 and server system 1004.

Server system 1004 may include one or more server-side computing devices. User computing device 1002 may include a media content processing device (e.g., a set-top-box device, DVR device, television, gaming console, personal media player, media server, home media network gateway device, tablet computer, smartphone device, mobile device, etc.) capable of accessing and providing media content and/or media content recommendations for presentation to and experiencing by an end user 1008 of the media service.

Server system 1004 and/or user computing device 1002 may perform one or more operations to provide a media service to end user 1008. User computing device 1002 may provide a media service user interface 1010 through which end user 1008 may interact with the media service. Through media service user interface 1010, end user 1008 may access the media service, such as by accessing one or more features of the media service, media content accessible through the media service, and/or media content recommendations generated by system 100 and personalized to end user 1008. In certain examples, media service user interface 1010 may include a graphical user interface provided by user computing device 1002 for display on a display screen for use by end user 1008. Media program guide user interface 1010 may be displayed on any suitable display screen accessible by end user 1008, including on a display screen of a display device included in user computing device 1002 or communicatively connected to user computing device 1002.

Accordingly, in implementation 1000, system 100 may output a media content recommendation to user computing device 1002 for presentation to end user 1008 by user computing device 1002. For example, a media content recommendation may be output for processing and presentation by user computing device 1002 in media service user interface 1010.

System 100 may generate and output a media content recommendation in any suitable context, such as in any suitable user interface context of media service user interface 1010 and/or a media service. As an example, media service user interface 1010 may include a "more like this" feature that is selectable by end user 1008 to request a recommendation of media content that is similar to a starting-point subject such as a starting-point media program or other subject. As another example, media service user interface 1010 may include a feature configured for use by end user 1008 to request a recommendation of media content that is related to multiple starting-point subjects, such as two media programs, two non-media-program subjects, or a combination of one media program and one non-media-program subject. As another example, media service user interface 1010 may include a feature configured for use by end user 1008 to submit an initial media content recommendation to system 100 to obtain a media content recommendation enhanced by knowledge graph data 102. As another example, media service user interface 1010 may include a feature configured for use by end user 1008 to request a that a media program be recommended based on submission of one or more parameters and/or instructions to a knowledge graph. As another example, system 100 may use a generated media content recommendation to auto-populate a personal user media channel (e.g., a user personalized virtual television channel). These features and contexts are illustrative only. System 100 may generate and output a media content recommendation in any suitable context and/or for any suitable feature.

While examples described herein have mentioned certain exemplary attributes of media programs and relationships between media programs, the examples are illustrative only. Any attribute of a media program may be used as the basis for a relationship with another subject in a knowledge graph. Examples of such attributes of a media program may include, without limitation, genre, cast, studio, location, cinematographer, plot summary, description, closed captioning, metadata, and/or other information.

In certain examples, text associated with a media program may be used to identify a relationship with a subject in a knowledge graph. The text may be associated with the media program in any suitable way, such as by being included in a textual description of the media program, closed captioning data for the media program, electronic program guide information, or social media content (e.g., as a hashtag). To illustrate, the text "dark knight" may be associated with a movie titled "Batman." System 100 may identify this relationship and use it to identify a knowledge graph relationship with the movie in knowledge graph 112 in any of the ways described herein. For instance, the text "dark knight" may be part of a link to another media program in knowledge graph 112.

In certain examples, an enhanced set of data may be curated on top of knowledge graph. The curation may be performed by system 100, by manual processing, or a combination thereof. The curation may leverage media service data, electronic program guide data, or other data about media content together with knowledge graph data from the knowledge graph to form a curated set of enhanced data. The curated set of enhanced data may be an enhanced knowledge graph created on top of an open source knowledge graph.

The curated set of enhanced data may then be used by system 100 when generating a media content recommendation. For example, where the curated set of enhanced data is an enhanced knowledge graph, system 100 may interface with the enhanced knowledge graph in any of the ways described herein.

Figure 11:
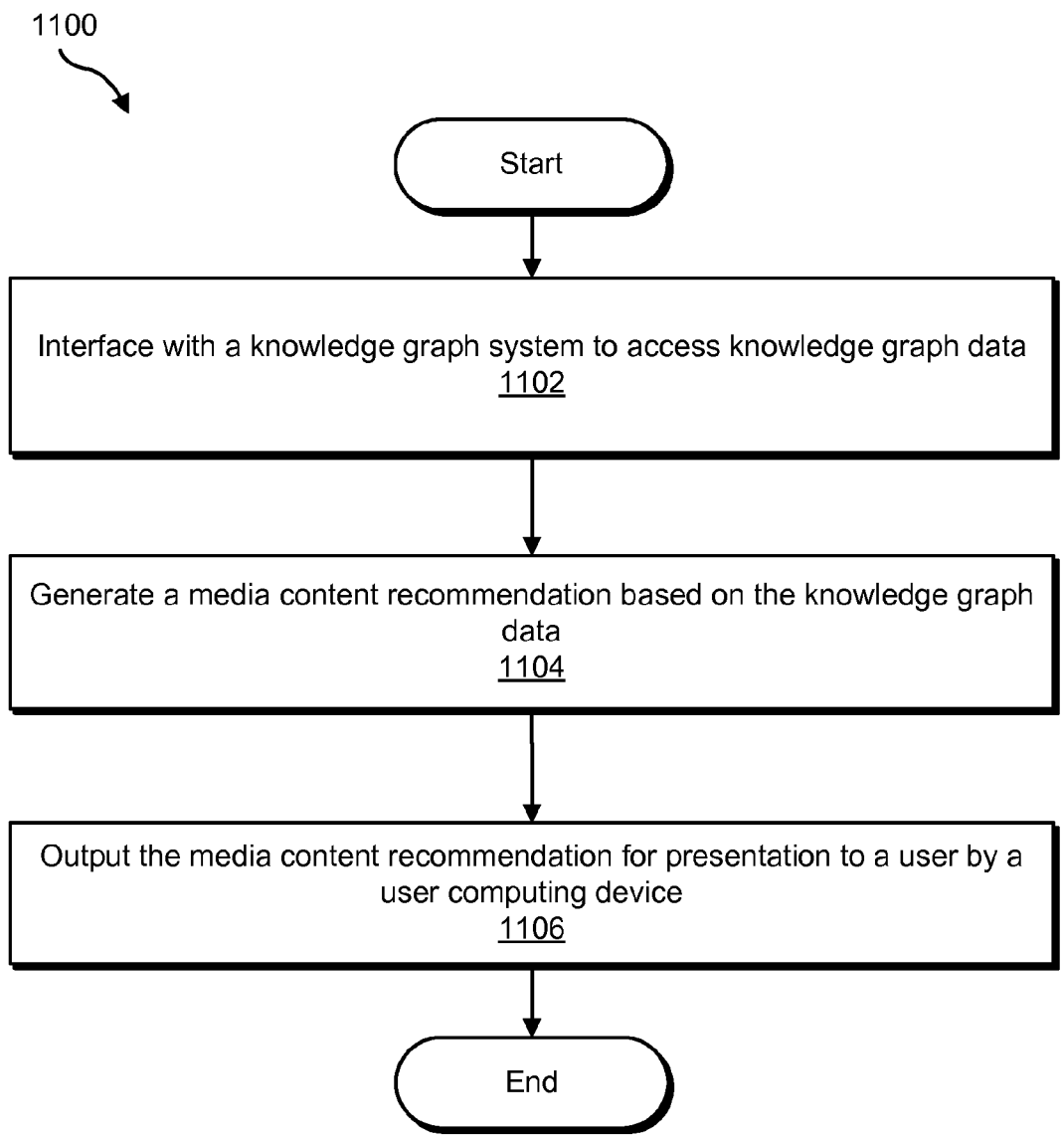
FIGS. 11-12 illustrate exemplary methods according to principles described herein.
Figure 12:
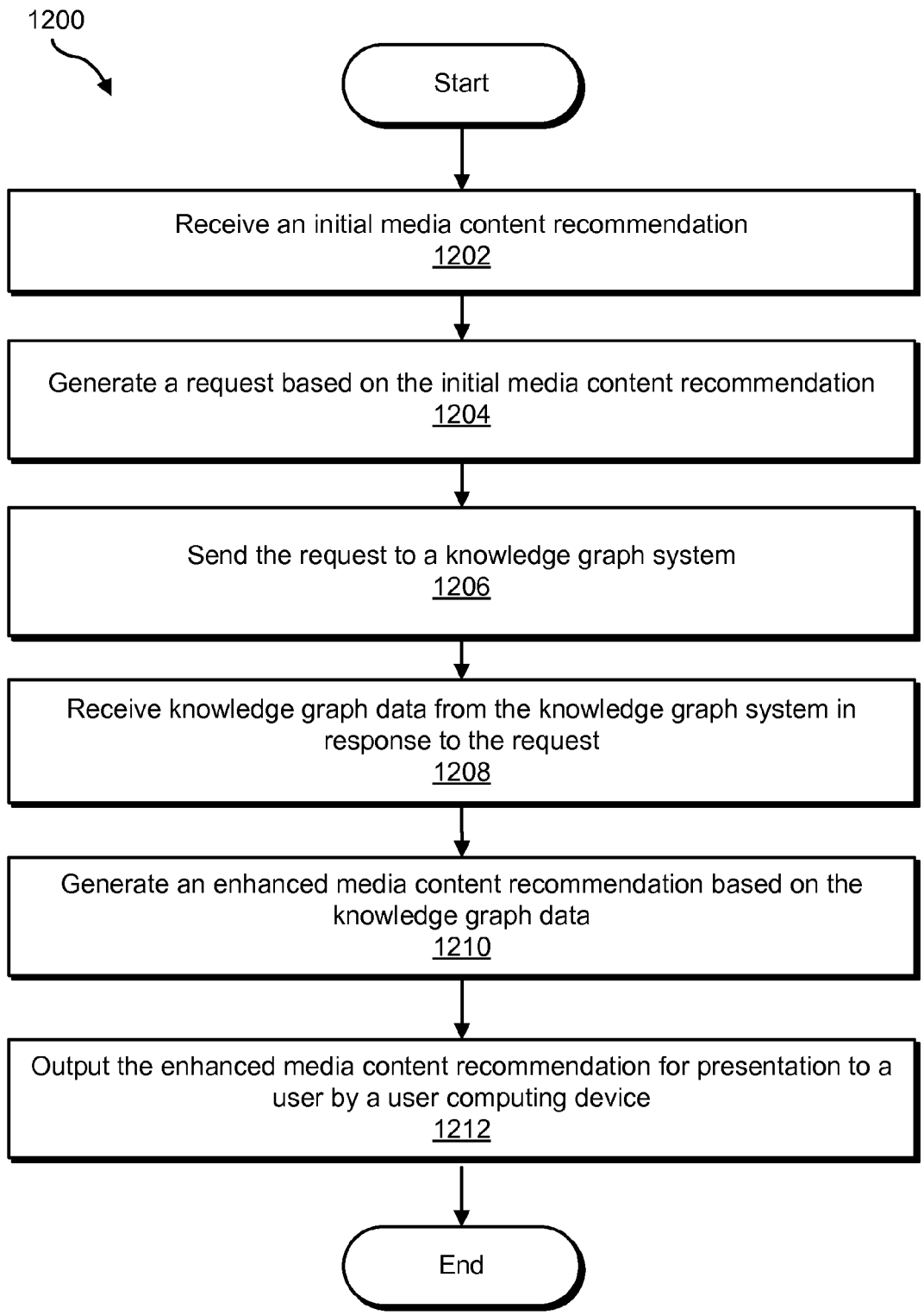

FIGS. 11-12 illustrate exemplary methods 1100-1200 according to principles described herein. While FIGS. 11-12 illustrate exemplary steps according to certain embodiments, other embodiments may omit, add to, reorder, combine, and/or modify any of the steps shown in FIGS. 11-12. In certain embodiments, one or more of the steps shown in FIGS. 11-12 may be performed by system 100 and/or one or more components or implementations of system 100, such as by a computing device implementing system 100.

In step 1102 of method 1100, a media content recommendation system interfaces with a knowledge graph system to access knowledge graph data. Step 1102 may be performed in any of the ways described herein, including by the media content recommendation system generating and sending a request, such as request 108, to the knowledge graph system and receiving the knowledge graph data in response to the request.

In step 1104, the media content recommendation system generates a media content recommendation based on the knowledge graph data, such as described herein. The media content recommendation may include recommendation content indicating a recommended media program and a knowledge graph relationship between a subject and the media program in a knowledge graph, such as described herein.

In step 1106, the media content recommendation system outputs the media content recommendation for presentation to a user by a user computing device, such as described herein.

In step 1202 of method 1200, a media content recommendation system receives an initial media content recommendation, such as described herein.

In step 1204, the media content recommendation system generates a request based on the initial media content recommendation, such as described herein.

In step 1206, the media content recommendation system sends the request to a knowledge graph system, such as described herein.

In step 1208, the media content recommendation system receives knowledge graph data from the knowledge graph system in response to the request, such as described herein.

In step 1210, the media content recommendation system generates an enhanced media content recommendation based on the knowledge graph data, such as described herein.

In step 1212, the media content recommendation system outputs the enhanced media content recommendation for presentation to a user by a user computing device, such as described herein.

Figure 13:
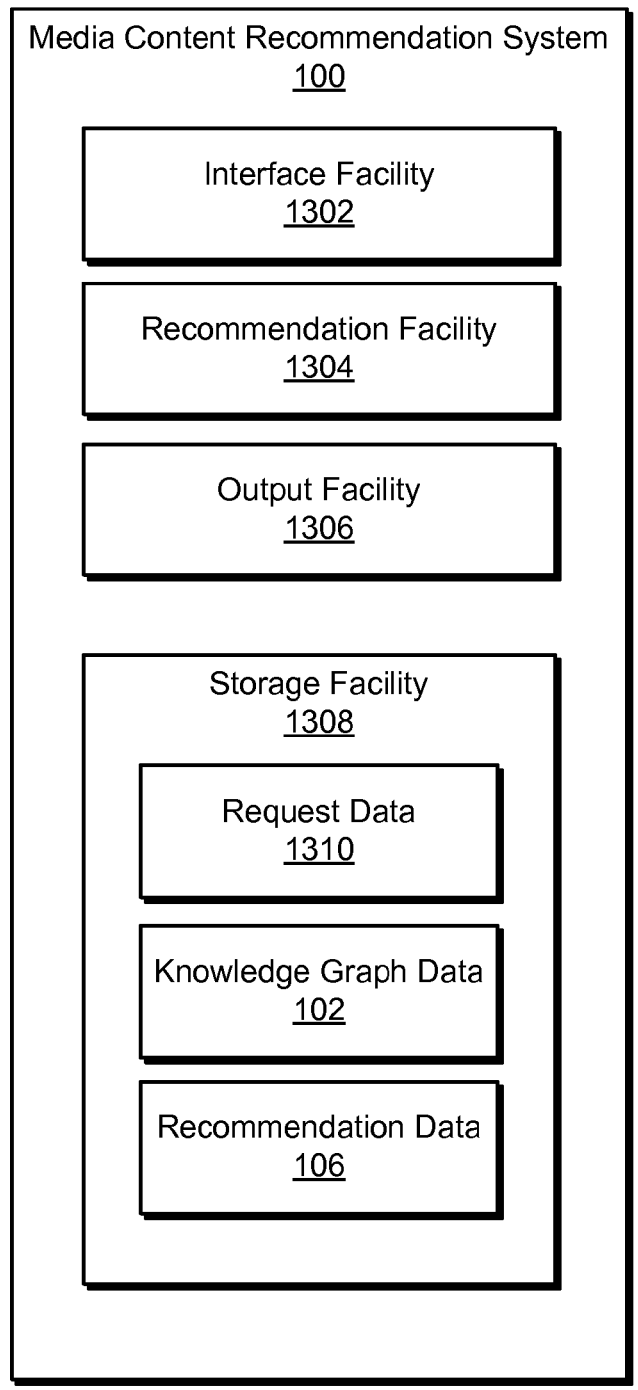
FIG. 13 illustrates exemplary components of a media content recommendation system according to principles described herein.

System 100 may be implemented in any suitable way and may include any suitable components. FIG. 13 illustrates exemplary components of system 100. As shown, system 100 may include, without limitation, an interface facility 1302, a recommendation generation facility 1304 ("recommendation facility 1304"), an output facility 1306, and a storage facility 1308 selectively and communicatively coupled to one another. Any suitable communication technologies may be employed to facilitate communications between facilities 1302-1308.

Although facilities 1302-1308 are shown to be separate facilities in FIG. 13, facilities 1302-1308 may be combined into a single facility or split into additional facilities as may serve a particular implementation. Additionally or alternatively, storage facility 1308 may be omitted from and external to system 100 in certain alternative implementations. Facilities 1302-1308 of system 100 may include or be otherwise implemented by one or more physical computing devices configured to perform one or more of the operations described herein.

Interface facility 1302 may interface with one or more external entities, such as knowledge graph system 104. Interface facility 1302 may interface with knowledge graph system 104 in any of the ways described herein, including by submitting request 108 to knowledge graph system 104 and receiving knowledge graph data 102 from knowledge graph system 104 in response to the request 108. Recommendation facility 1304 may perform any of the operations described herein to generate a media content recommendation based on knowledge graph data 102. Output facility 1306 may perform any of the operations described herein to output the media content recommendation for presentation to a user by a user computing device. In certain implementations, any of facilities 1302, 1304, and 1306 may direct a processor of a physical computing device to perform one or more of the operations described herein.

Storage facility 1308 may store data accessed, generated, and/or used by any of facilities 1302, 1304, and 1306. For example, storage facility 1308 may store request data 1310 representative of one or more requests for knowledge graph data 102, knowledge graph data 102 received from knowledge graph system 104, and recommendation data 106 representative of one or more media content recommendations generated by recommendation facility 1304. Storage facility 1308 may maintain additional or alternative data as may serve a particular implementation. For instance, in certain other examples, storage facility 1308 may store any of the user data and/or media service data described herein.

In certain embodiments, one or more of the systems, components, and/or processes described herein may be implemented and/or performed by one or more appropriately and specially configured computing devices. To this end, one or more of the systems and/or components described above may include or be implemented by any computer hardware and/or computer-implemented instructions (e.g., software) embodied on at least one non-transitory computer-readable medium and specially configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions executable by one or more computing devices. In general, a physical computer processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known non-transitory computer-readable media.

A non-transitory computer-readable medium (also referred to as a processor-readable medium) includes any non-transitory medium that participates in providing data (e.g., instructions) that may be read by a computer (e.g., by a processor of a computer). Such a non-transitory medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of non-transitory computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other non-transitory medium from which a computer can read.

Figure 14:
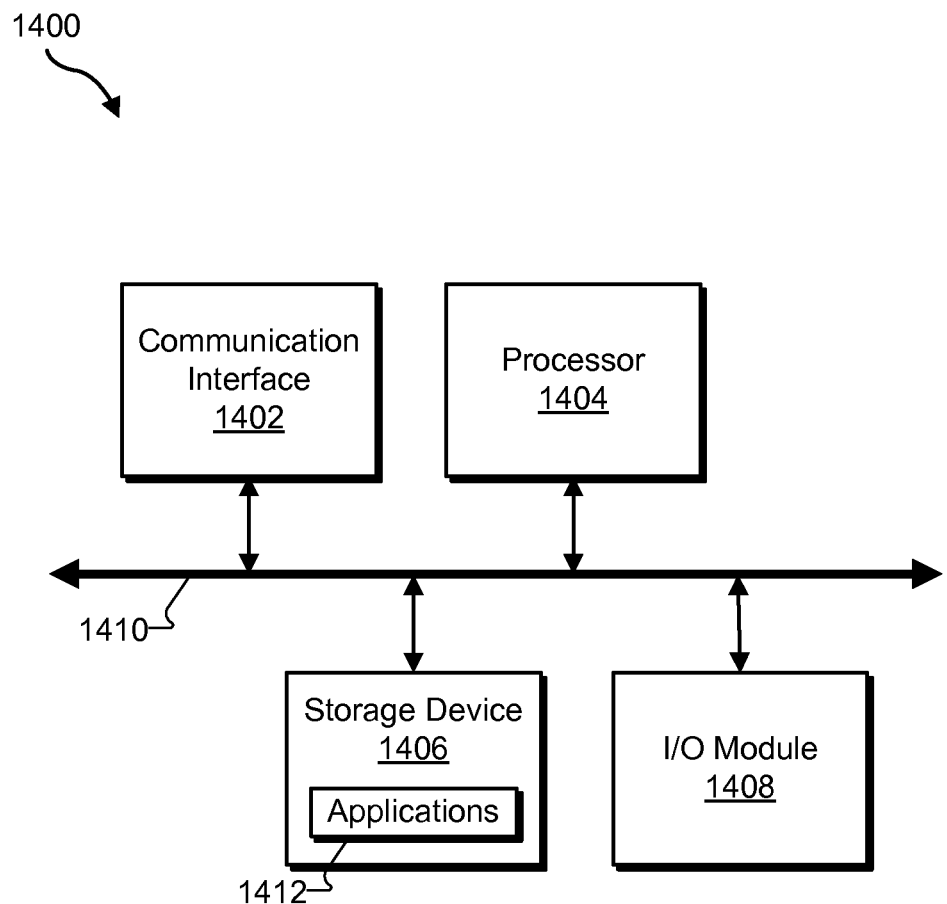
FIG. 14 illustrates an exemplary computing device according to principles described herein.

FIG. 14 illustrates an exemplary computing device 1400 that may be configured to perform one or more of the processes described herein. As shown in FIG. 14, computing device 1400 may include a communication interface 1402, a processor 1404, a storage device 1406, and an input/output ("I/O") module 1408 communicatively connected via a communication infrastructure 1410. While an exemplary computing device 1400 is shown in FIG. 14, the components illustrated in FIG. 14 are not intended to be limiting. Additional or alternative components may be used in other embodiments. Components of computing device 1400 shown in FIG. 14 will now be described in additional detail.

Communication interface 1402 may be configured to communicate with one or more computing devices. Examples of communication interface 1402 include, without limitation, a wired network interface (such as a network interface card), a wireless network interface (such as a wireless network interface card), a communications medium interface, a modem, and any other suitable interface. Communication interface 1402 may be configured to interface with any suitable communication media, protocols, and formats, including any of those mentioned above.

Processor 1404 generally represents any type or form of processing unit capable of processing data or interpreting, executing, and/or directing execution of one or more of the instructions, processes, and/or operations described herein. Processor 1404 may direct execution of operations in accordance with one or more applications 1412 or other computer-executable instructions such as may be stored in storage device 1406 or another computer-readable medium.

Storage device 1406 may include one or more data storage media, devices, or configurations and may employ any type, form, and combination of data storage media and/or device. For example, storage device 1406 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1406. For example, data representative of one or more executable applications 1412 (which may include, but are not limited to, one or more of the software applications configured to direct processor 1404 to perform any of the operations described herein may be stored within storage device 1406.

I/O module 1408 may be configured to receive user input and provide user output and may include any hardware, firmware, software, or combination thereof supportive of input and output capabilities. For example, I/O module 1408 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1408 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1400. For example, one or more applications 1412 residing within storage device 1406 may direct processor 1404 to perform one or more processes or functions associated with interface facility 1302, recommendation facility 1304, and/or output facility 1306. Likewise, storage facility 1308 may be implemented by or within storage device 1406. In such implementations, system 100 may be referred to as a computer-implemented system 100.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    sending, by a media content recommendation system to a knowledge graph system, a request that includes
        subject data indicating a starting-point subject, and
        traversal data indicating how to traverse a knowledge graph from a starting node that represents the starting-point subject to find an ending node that represents a media program, the traversal data comprising at least one of a degree-of-separation parameter, an edge selection parameter for a user, and a relationship parameter;
    receiving, by the media content recommendation system from the knowledge graph system in response to the request, knowledge graph data that represents the media program and at least one knowledge graph relationship between the starting-point subject and the media program;
    generating, by the media content recommendation system based on the knowledge graph data, a media content recommendation that includes recommendation content indicating the media program and the at least one knowledge graph relationship between the starting-point subject and the media program; and
    outputting, by the media content recommendation system, the media content recommendation for presentation to the user by a user computing device;
    wherein the knowledge graph is based on a Resource Description Framework graph data model in which:
        each node included in a plurality of nodes represents a subject; and
        edges interconnect the plurality of nodes and represent at least one of relationships and properties between the subjects represented by the plurality of nodes.

2. The method of claim 1, wherein:
    the starting-point subject comprises a first media program;
    the subject data further indicates the media program that is recommended to the user and that is represented by the ending node is to be an ending-point subject; and the traversal data further comprises an instruction to find, within the knowledge graph, a shortest path from the starting node that represents the first media program to the ending node that represents the media program recommended to the user.

3. The method of claim 1, wherein the traversal data further comprises:
an instruction to start at the starting node that represents the starting-point subject and traverse away from the starting node by selecting, from a plurality of edges connected to the starting node, an edge to traverse based on the edge-selection parameter for the user.

4. The method of claim 3, wherein the traversal data further comprises an instruction to continue to traverse away from the starting node at least until a threshold degree-of-separation from the starting node is reached.

5. The method of claim 1, wherein the traversal data further comprises:
an instruction to find a certain media program that is related to the starting-point subject in a manner specified by the relationship parameter.

6. The method of claim 1, wherein the recommendation content indicates a degree-of-separation in the knowledge graph for the at least one knowledge graph relationship between the starting-point subject and the media program recommended to the user.

7. The method of claim 1, wherein the recommendation content indicates a type of relationship in the knowledge graph for the at least one knowledge graph relationship between the starting-point subject and the media program recommended to the user.

8. The method of claim 1, further comprising:
receiving, by the media content recommendation system, an initial media content recommendation; and
generating, by the media content recommendation system, the request based on the initial media content recommendation;
wherein the generating of the media content recommendation comprises applying the knowledge graph data to the initial media content recommendation to generate an enhanced media content recommendation.

9. The method of claim 1, embodied as computer-executable instructions on at least one non-transitory computer-readable medium.

10. A method comprising:
interfacing, by a media content recommendation system, with a knowledge graph system to access knowledge graph data that represents a knowledge graph relationship between a subject and a media program in a knowledge graph, the knowledge graph data accessed based on traversal data that indicates how to traverse the knowledge graph from a starting node that represents the starting-point subject to find an ending node that represents the media program, the traversal data comprising at least one of a degree-of-separation parameter, an edge selection parameter for a user, and a relationship parameter;
generating, by the media content recommendation system based on the knowledge graph data, a media content recommendation that includes recommendation content indicating the media program and the knowledge graph relationship between the subject and the media program; and
outputting, by the media content recommendation system, the media content recommendation for presentation to the user by a user computing device;
wherein the knowledge graph is based on a Resource Description Framework graph data model in which:
each node included in a plurality of nodes represents a subject; and
edges interconnect the plurality of nodes and represent at least one of relationships and properties between the subjects represented by the plurality of nodes.

11. The method of claim 10, further comprising:
receiving, by the media content recommendation system, an initial media content recommendation;
wherein:
the interfacing with the knowledge graph system to access the knowledge graph data comprises
generating a request based on the initial media content recommendation,
sending the request to the knowledge graph system, and
receiving the knowledge graph data from the knowledge graph system in response to the request; and
the generating of the media content recommendation comprises applying the knowledge graph data to the initial media content recommendation to generate an enhanced media content recommendation.

12. The method of claim 10, wherein the recommendation content indicates a degree-of-separation and a type of relationship in the knowledge graph for the knowledge graph relationship between the subject and the media program recommended to the user.

13. A system comprising:
at least one physical computing device that:
sends, to a knowledge graph system, a request that includes
subject data indicating a starting-point subject, and
traversal data indicating how to traverse a knowledge graph from a starting node that represents the starting-point subject to find an ending node that represents a media program, the traversal data comprising at least one of a degree-of-separation parameter, an edge selection parameter for a user, and a relationship parameter;
receives, from the knowledge graph system in response to the request, knowledge graph data that represents the media program and at least one knowledge graph relationship between the starting-point subject and the media program;
generates, based on the knowledge graph data, a media content recommendation that includes recommendation content indicating the media program and the at least one knowledge graph relationship between the starting-point subject and the media program; and
outputs the media content recommendation for presentation to the user by a user computing device;
wherein the knowledge graph is based on a Resource Description Framework graph data model in which:
each node included in a plurality of nodes represents a subject; and
edges interconnect the plurality of nodes and represent at least one of relationships and properties between the subjects represented by the plurality of nodes.

14. The system of claim 13, wherein:
the starting-point subject comprises a first media program;
the subject data further indicates the media program that is recommended to the user and that is represented by the ending node is to be an ending-point subject; and
the traversal data comprises an instruction to find, within the knowledge graph, a shortest path from the starting node that represents the first media program to the ending node that represents the media program recommended to the user.

15. The system of claim 13, wherein the traversal data further comprises:
   an instruction to start at the starting node that represents the starting-point subject and traverse away from the starting node by selecting, from a plurality of edges connected to the starting node, an edge to traverse based on the edge-selection parameter for the user.

16. The system of claim 15, wherein the traversal data further comprises an instruction to continue to traverse away from the starting node at least until a threshold degree-of-separation from the starting node is reached.

17. The system of claim 13, wherein the traversal data further comprises:
   an instruction to find a media program that is related to the starting-point subject in a manner specified by the relationship parameter.

18. The system of claim 13, wherein the recommendation content indicates a degree-of-separation in the knowledge graph for the at least one knowledge graph relationship between the starting-point subject and the media program recommended to the user.

19. The system of claim 13, wherein the recommendation content indicates a type of relationship in the knowledge graph for the at least one knowledge graph relationship between the starting-point subject and the media program recommended to the user.

20. The system of claim 13, wherein the at least one physical computing device:
   receives an initial media content recommendation;
   generates the request based on the initial media content recommendation; and
   generates the media content recommendation by applying the knowledge graph data to the initial media content recommendation to generate an enhanced media content recommendation.

* * * * *